Dec. 18, 1923.

E. G. BERG 1,477,935

ADJUSTABLE NUT FOR MICROMETERS

Filed Feb. 14, 1922

Inventor
Emil G. Berg
By Attorneys
Southgate & Southgate

Patented Dec. 18, 1923.

1,477,935

UNITED STATES PATENT OFFICE.

EMIL G. BERG, OF ASHBURNHAM, MASSACHUSETTS, ASSIGNOR OF ONE-HALF TO CARL HEDSTROM, OF GARDNER, MASSACHUSETTS.

ADJUSTABLE NUT FOR MICROMETERS.

Application filed February 14, 1922. Serial No. 536,543.

*To all whom it may concern:*

Be it known that I, EMIL G. BERG, a citizen of the United States, residing at Ashburnham, in the county of Worcester and State of Massachusetts, have invented a new and useful Adjustable Nut for Micrometers, of which the following is a specification.

This invention relates to an adjustable nut, particularly designed for use in a micrometer. It is very desirable that the screw of a micrometer shall encounter substantially uniform resistance throughout its range of travel, a result exceedingly difficult to attain, as any slight variation in the thread of the screw will cause a noticeable variation in the "feel" of the micrometer.

It is the object of my invention to provide an improved micrometer nut, so designed that substantially uniform resistance to rotation will be encountered throughout the range of the instrument. With this object in view, my invention in its preferred form embodies an extended cylindrical nut slotted at one end and having resilient portions inwardly displaced to engage the screw and uniformly resist rotation thereof.

My invention further relates to arrangement and combinations of parts which will be hereinafter described and more particularly pointed out in the appended claim.

A preferred form of my invention is shown in the drawings, in which—

Figure 2:
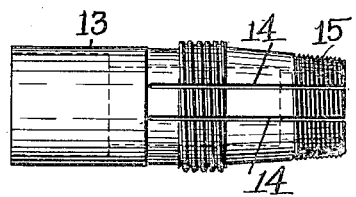
Fig. 2 is an enlarged side elevation of the nut.

Referring to the drawings, I have shown the usual micrometer screw or plunger 10, provided with a head 11, and threaded within a nut 13. The nut 13 is of extended cylindrical form and may be secured in the micrometer frame in any usual manner, by fastening devices not shown.

The nut 13 is provided with a plurality of slots 14, extending from one end of the nut for substantially half of the length thereof. The slotted end of the nut is threaded on the inside to fit the micrometer screw and is also provided with a tapered outer threaded portion 15, to receive a clamping nut 16, by which the effective diameter of the inner thread may be adjusted.

Figure 3:
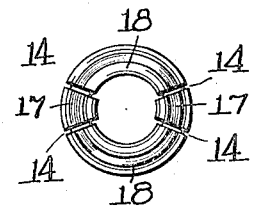
Fig. 3 is an end view thereof.
Figure 1:
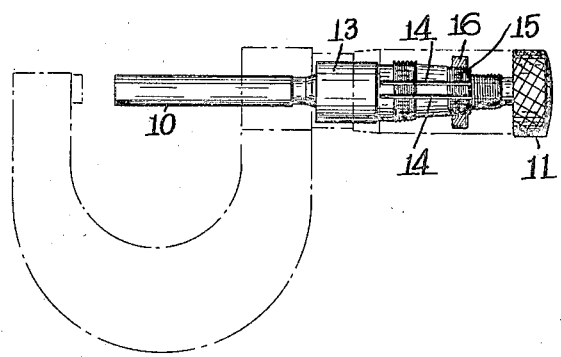
Fig. 1 is a side elevation of my improved micrometer nut with a micrometer screw threaded therein, other usual parts of the micrometer being indicated in broken lines.

The slots 14 are so disposed that certain portions 17 of the nut are of relatively narrow width and these portions 17 are displaced inwardly from their normal positions as indicated in Fig. 3. The nut 13 is preferably hardened and ground and the portions 17 are resilient and yieldingly engage the micrometer screw 10. They thus apply continuous pressure or friction thereon, and yieldingly resist rotation of the screw.

The outer nut 16 may be adjusted so that the wider portions 18 of the nut 13 will fit the screw so closely as to prevent back lash, while the inwardly displaced portions 17 yieldingly engage the screw and move inward to maintain their frictional engagement therewith whenever slight variations in the diameter of the screw occur.

Having thus described my invention, it will be evident that changes and modifications can be made therein by those skilled in the art within the spirit and scope of my invention as set forth in the claim, and I do not wish to be otherwise limited to the details herein disclosed, but what I claim is;

In a micrometer having a micrometer screw, and adjustable cylindrical nut for said screw, said nut having one end slotted to form relatively wide and relatively narrow axially extending portions, certain of said narrow portions being bent inward from normal position and exerting yielding pressure upon the micrometer screw, whereby substantially uniform resistance to rotation thereof is attained.

In testimony whereof I have hereunto affixed my signature.

EMIL G. BERG.